(12) United States Patent
Bachinski et al.

(10) Patent No.: US 8,030,598 B2
(45) Date of Patent: *Oct. 4, 2011

(54) ELECTRIC GRILL

(75) Inventors: Thomas J. Bachinski, Lakeville, MN (US); Douglas Mark Holm, Minneapolis, MN (US); Daniel Curtis Shimek, Apple Valley, MN (US); Robert Samuel Waddell, Brooklyn Park, MN (US); Eric Paul Hawkinson, Prior Lake, MN (US)

(73) Assignee: The Outdoor Greatroom Company LLLP, Eagan, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/029,076

(22) Filed: Feb. 11, 2008

(65) Prior Publication Data

US 2008/0128406 A1 Jun. 5, 2008

Related U.S. Application Data

(63) Continuation of application No. 10/803,169, filed on Mar. 17, 2004, now Pat. No. 7,342,202.

(51) Int. Cl.
*A47J 37/06* (2006.01)
*A47J 37/07* (2006.01)
*H05B 1/02* (2006.01)

(52) U.S. Cl. ........ 219/386; 219/398; 219/477; 219/486; 219/462.1

(58) Field of Classification Search ........................ None
See application file for complete search history.

(56) References Cited

U.S. PATENT DOCUMENTS

| | | | |
|---|---|---|---|
| 3,579,264 | A | 5/1971 | Mork et al. |
| 3,683,792 | A | 8/1972 | Groves, Jr. et al. |
| 3,938,431 | A | 2/1976 | Potvin |
| 3,959,620 | A | 5/1976 | Stephen, Jr. |
| 3,984,699 | A | 10/1976 | Bailey |
| 4,024,378 | A | 5/1977 | McIntosh |
| 4,242,554 | A | 12/1980 | Hurko et al. |
| 4,430,559 | A | 2/1984 | Rabay |
| 4,512,250 | A | 4/1985 | Schindler et al. |
| 4,559,441 | A | 12/1985 | Rudich et al. |
| 4,641,015 | A | 2/1987 | Mayeur |
| 5,036,180 | A | 7/1991 | Scott |
| 5,477,028 | A | 12/1995 | Chang |
| 5,524,528 | A | 6/1996 | Yeh |
| 5,582,094 | A | 12/1996 | Peterson et al. |
| 5,719,377 | A | 2/1998 | Giebel et al. |
| 5,821,507 | A | 10/1998 | Sasaki et al. |

(Continued)

FOREIGN PATENT DOCUMENTS

| | | |
|---|---|---|
| DE | 297 14 113 U1 | 11/1997 |
| EP | 1 080 677 A1 | 3/2001 |

*Primary Examiner* — J. Pelham
(74) *Attorney, Agent, or Firm* — Merchant & Gould P.C.

(57) ABSTRACT

An electric cooking assembly includes a main body portion that defines a cooking area. First and second cooking surfaces are contained within the cooking area. A first electric heating element arranged to provide heat to at least a portion of the first cooking surface, and a second electric heating element is arranged to heat at least a portion of the second cooking surface. The main body portion may include first and second hood members. The first hood member defines the cooking area and the second hood member is positioned at least partially within the cooking area and configured to decrease heat lost from the cooking assembly during preparation of food products in the cooking area. The second hood member is configured for adjustment between an open position providing access to the cooking surface and a closed position covering at least a portion of the cooking surface.

20 Claims, 12 Drawing Sheets

U.S. PATENT DOCUMENTS

| | | |
|---|---|---|
| 5,934,180 A | 8/1999 | Lin |
| 6,037,571 A | 3/2000 | Christopher |
| 6,104,004 A | 8/2000 | Ragland et al. |
| RE37,152 E | 5/2001 | O'Brien et al. |
| 6,262,399 B1 | 7/2001 | Lau et al. |
| 6,271,504 B1 | 8/2001 | Barritt |
| 6,369,366 B1 | 4/2002 | Mullen |
| 6,369,367 B1 | 4/2002 | Maier |
| 6,386,092 B1 | 5/2002 | Grohs |
| 6,437,291 B1 | 8/2002 | Hopponen |
| 6,674,051 B2 | 1/2004 | Arntz et al. |
| 6,748,940 B2 | 6/2004 | Bennett et al. |
| 6,802,308 B1 | 10/2004 | Nugent et al. |
| 7,342,202 B2 | 3/2008 | Bachinski et al. |
| 2003/0015518 A1 | 1/2003 | Baker et al. |
| 2003/0197001 A1 | 10/2003 | Grohs |

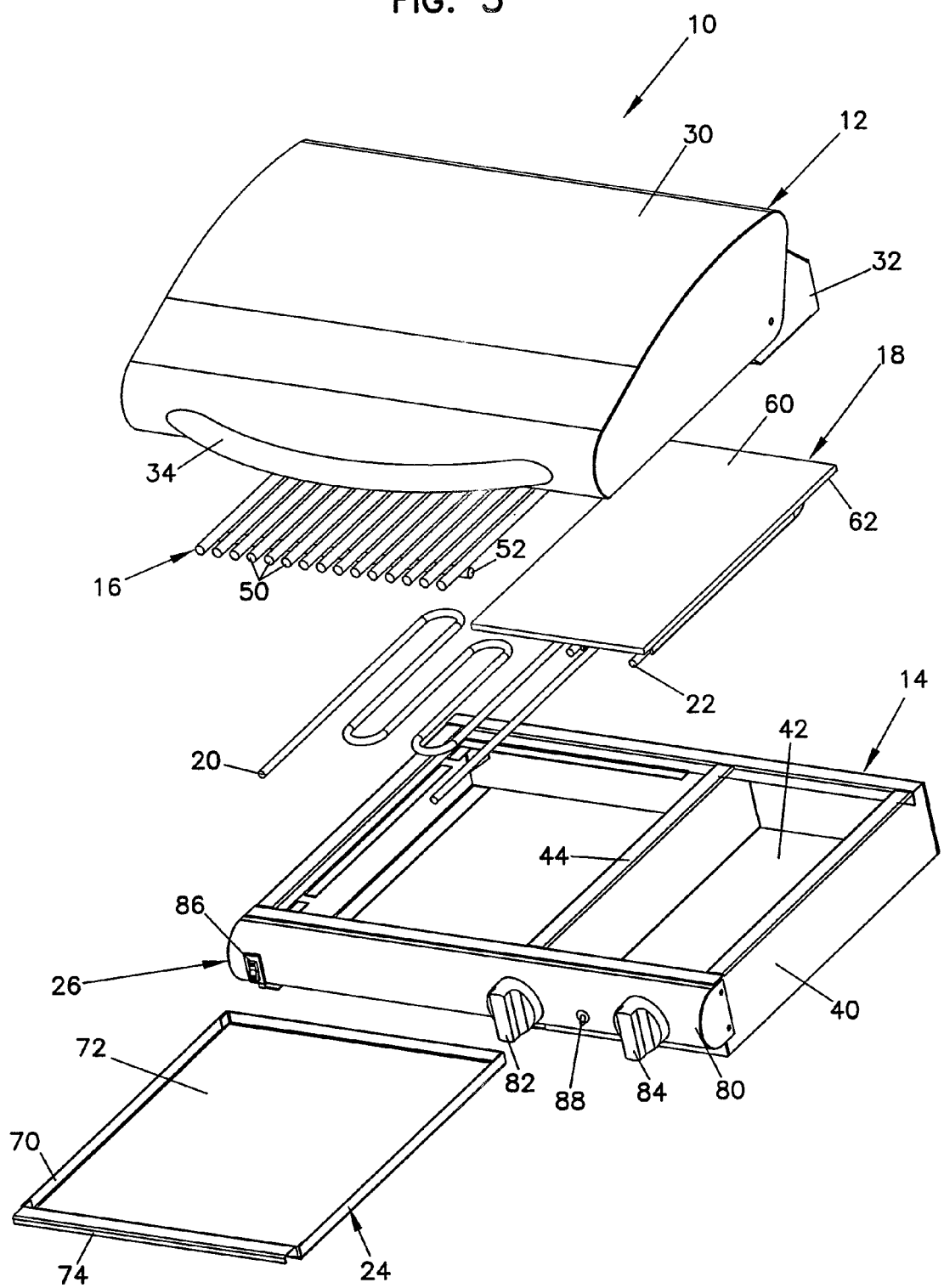

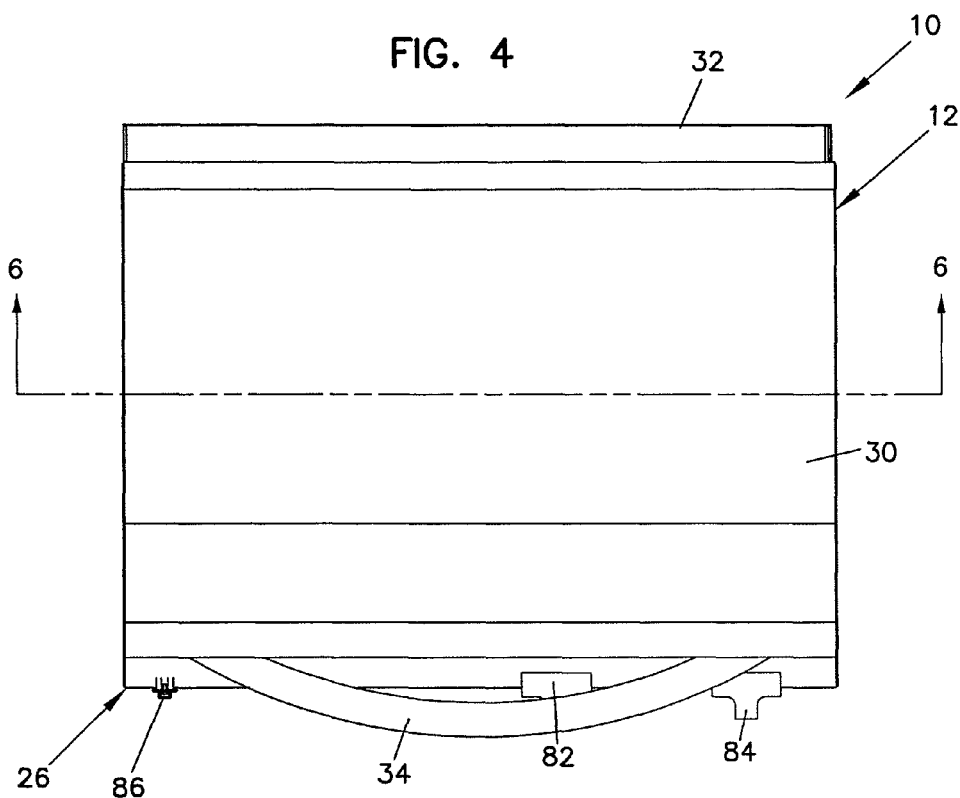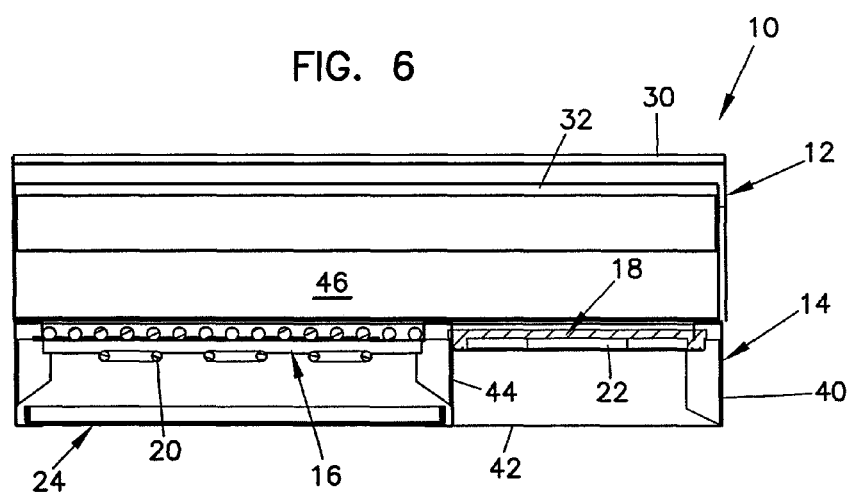

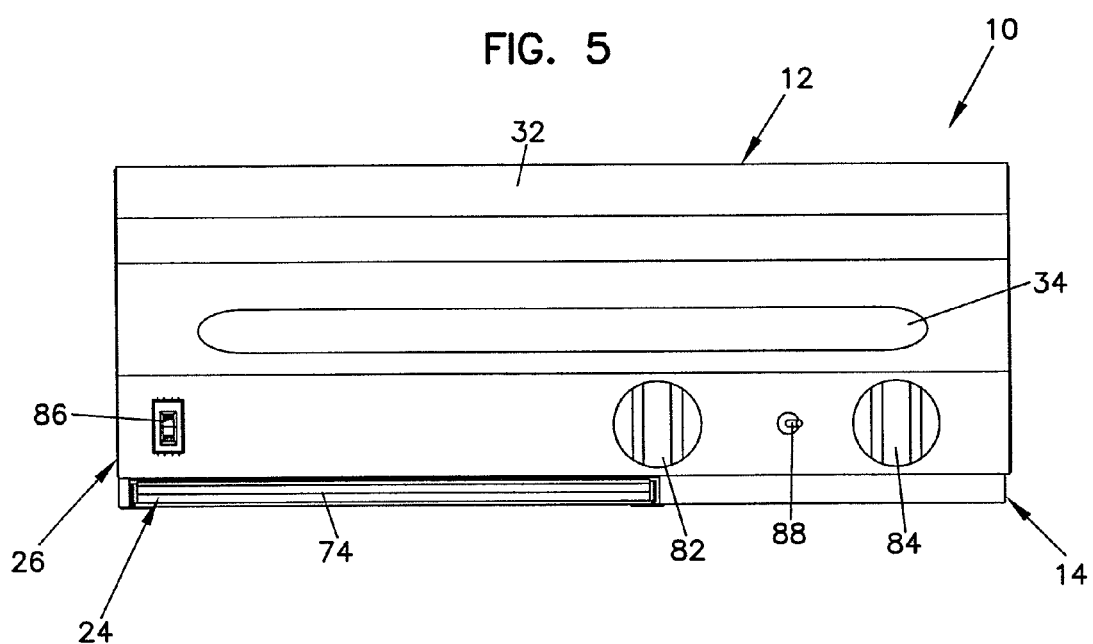

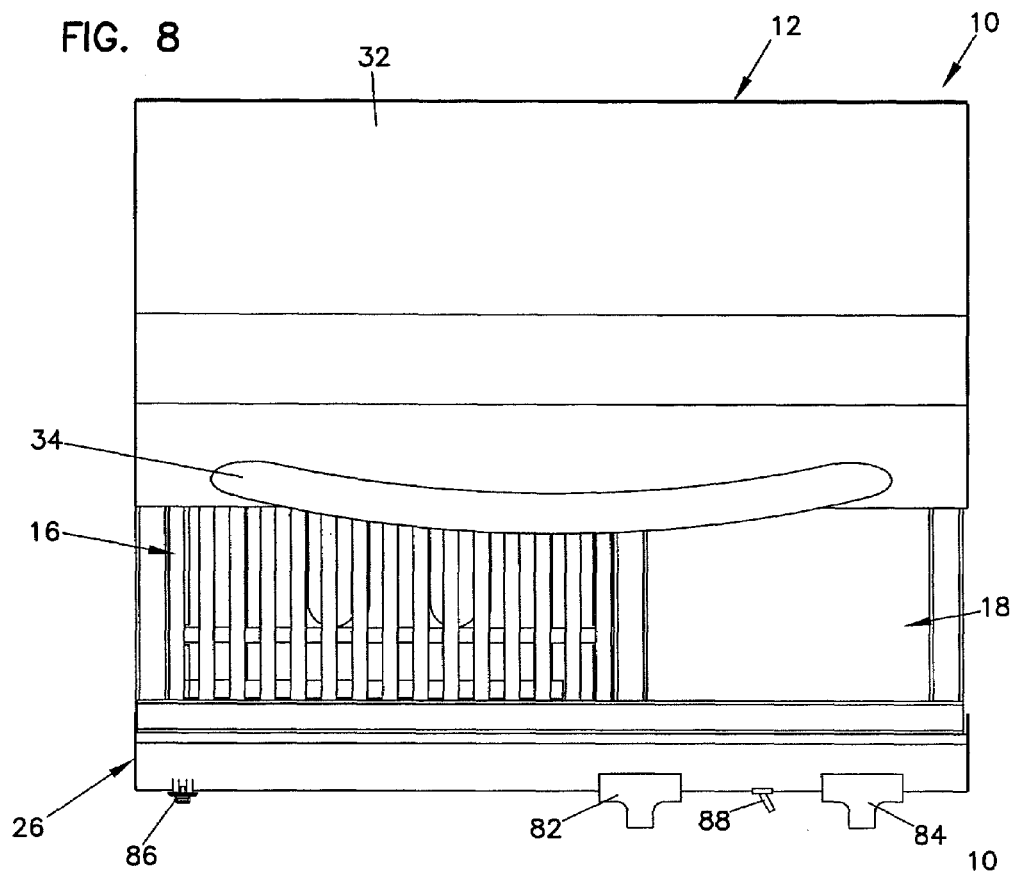
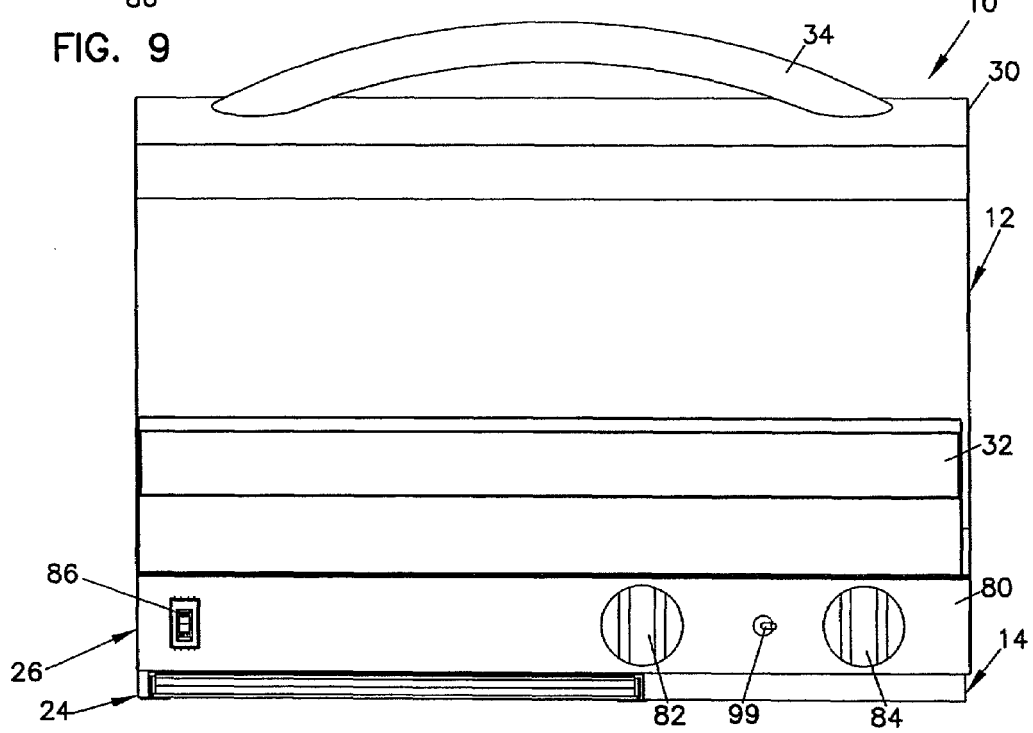

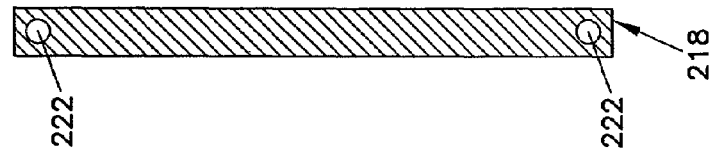
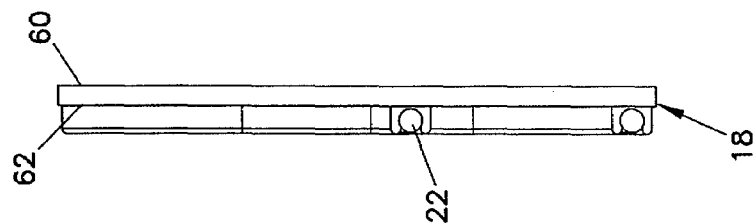
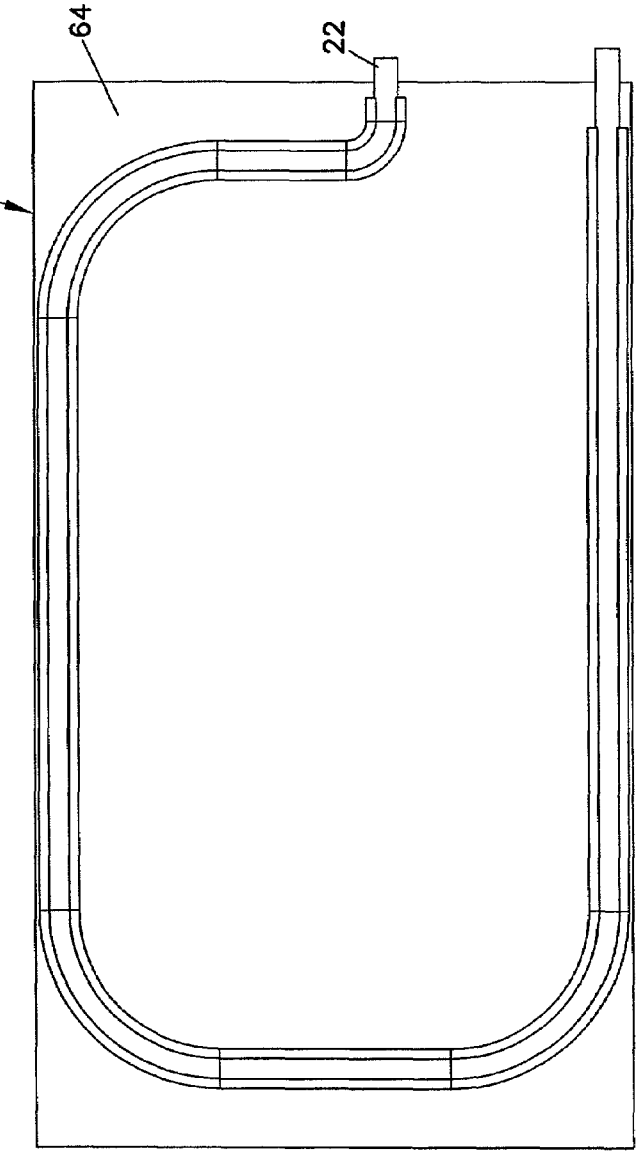

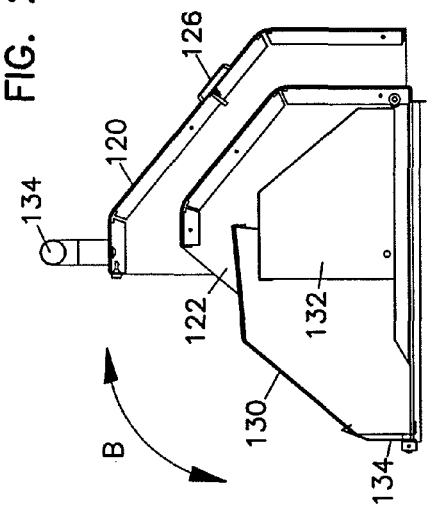
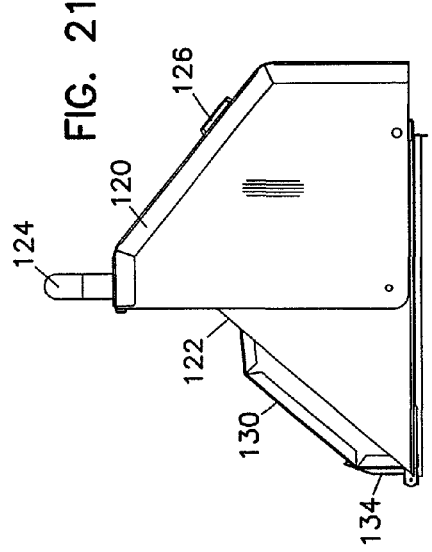
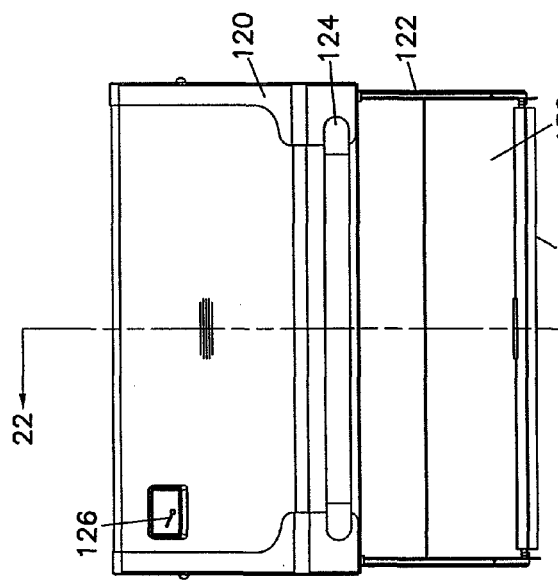
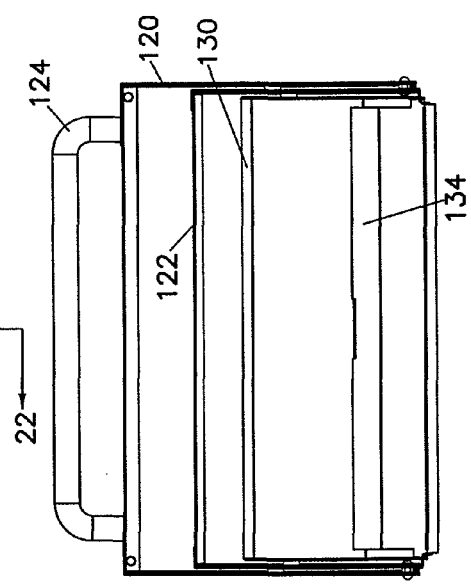

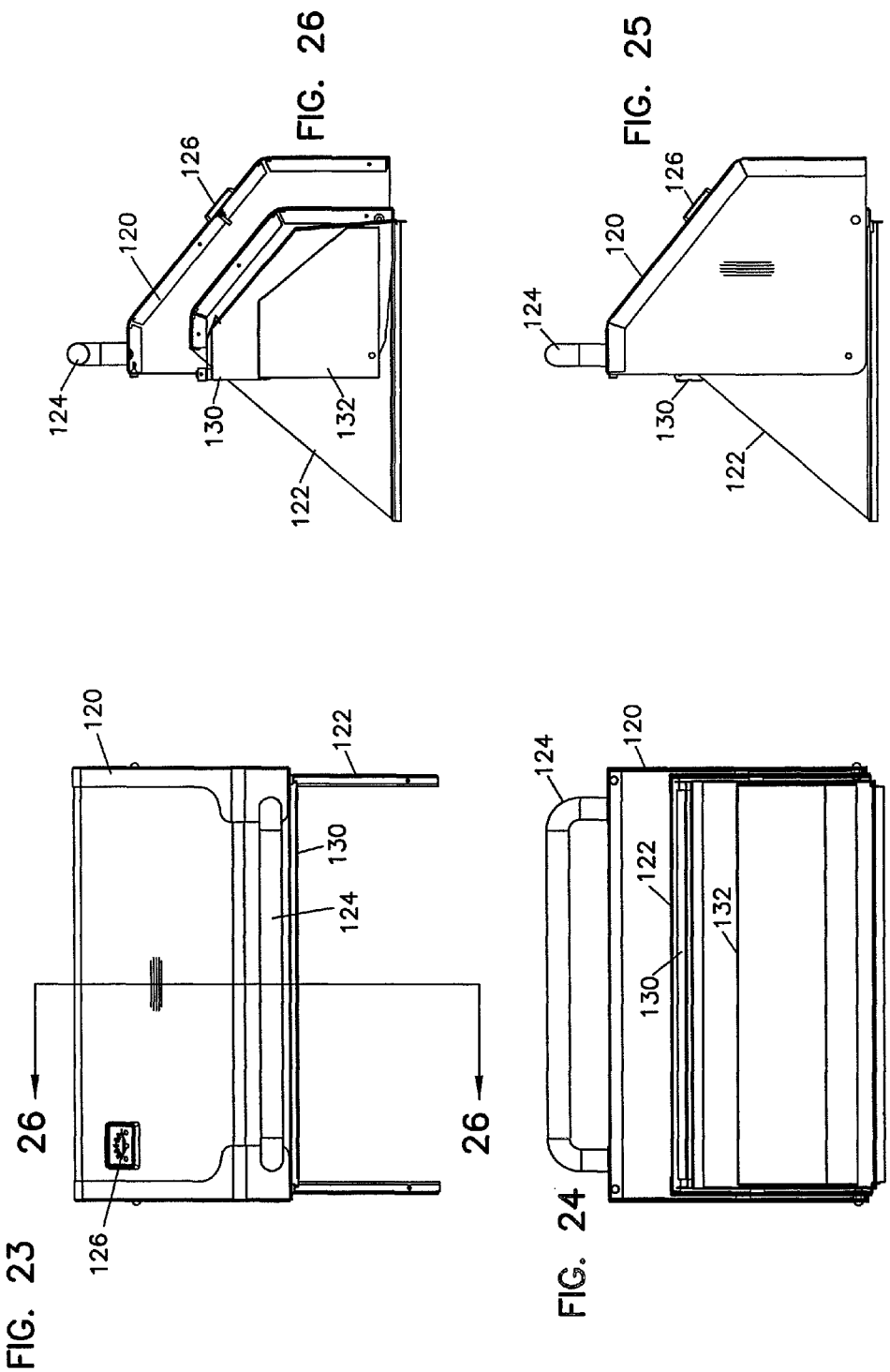

ELECTRIC GRILL

CROSS REFERENCE TO RELATED APPLICATION

This application is a continuation of application Ser. No. 10/803,169, filed Mar. 17, 2004, which application is incorporated herein by reference.

BACKGROUND OF THE INVENTION

1. Field of the Invention

The present invention generally relates to grill assemblies for preparing food products, and more particularly relates to electric grill assemblies and to a dual hood configuration for a grill assembly.

2. Related Art

Grill assemblies for preparing food products are well known in the art. Generally, many existing grill assemblies provide a cooking compartment that defines an enclosed cooking area (e.g., the primary cooking area). The cooking area can include one or more cooking surfaces that support the food articles during cooking. Typically, a source of thermal energy provides heat to the entire cooking area or to targeted portions of the cooking area. Most existing grill assemblies allow large amounts of heat loss to the outside environment and fail to minimize wind currents that can disrupt the cooking process within the cooking area of the grill. Further, most existing grills require a combustible fuel such as natural gas, propane, briquettes, or wood. Although burning a combustible fuel may provide additional flavor to the food being cooked, grill assemblies that combust fuel are typically not suited for use inside living structures and are prohibited in many housing complexes (e.g., condominium and apartment complexes). The use of electric cooking assemblies that generate sufficient heat for grilling purposes typically requires a 220-240V power source, which makes grilling using electricity as a source of heat impractical in many outdoor cooking situations. Improvements in cooking assemblies that address these shortcomings are, therefore, sought.

SUMMARY OF THE INVENTION

The present invention relates generally to grill assemblies for preparing food products, and more particularly relates to an electric grill assembly and to a dual hood configuration for a grill assembly.

One aspect of the invention relates to an electric cooking assembly configured for preparing food products. The cooking assembly includes a main body portion defining a cooking area including a first cooking surface and a second cooking surface, a first electric heating element arranged and configured to provide heat to at least a portion of the first cooking surface, and a second electric heating element configured to heat at least a portion of the second cooking surface. The first and second electric heating elements may be separately controlled such that only one heating element is operable at a given time, or may be controlled in any other combination or sequence of use.

Another aspect of the invention relates to a method of manufacturing a grill assembly that includes a main body portion defining a cooking area, first and second cooking surfaces, and first and second electric heating elements. The method includes the steps of arranging the first electric heating element to heat at least a portion of the first cooking surface, arranging the second electric heating element to heat at least a portion of the second cooking surface, and controlling the first and second heating elements independent from each other A further aspect of the invention relates to a method of assembling a cooking apparatus that including a main body portion, first and second cooking surfaces, first and second electric heating elements, and a control member. The main body portion includes a base member and a hood member that together define a cooking area. The method includes positioning the first and second cooking surfaces in the cooking area, positioning the first electric heating element in the cooking area between the first cooking surface and the base member, and coupling the second electric heating element to the second cooking surface. The method also includes coupling the control member to the first and second electric elements to control current flow to the first and second electric elements to maximize heat generation in the cooking area with a minimum amount of current flow.

A further aspect of the invention relates to a cooking assembly for preparing food products that includes a main body portion having a base member and a first hood assembly that together define a cooking area, a cooking surface, and a second hood assembly. The first hood assembly is adjustable relative to the base member to provide access to the cooking area, the cooking surface is positioned within the cooking area, and the second hood assembly is positioned at least partially within the cooking area between the cooking surface and the first hood assembly. The second hood assembly may be adjustable between an open position wherein the cooking surface is accessible and a closed position wherein the second hood member covers at least a portion of the cooking surface.

Another aspect of the invention relates to an electric grill configured for cooking food products that includes a base member, an electric heating element positioned in the base member, a first hood coupled to the base member thereby defining a cooking area between the base member and the first hood, a cooking surface positioned vertically above the electric element between the base member and the first hood, and a second hood positioned at least partially within cooking area. The second hood may be adjustable between an open position wherein the cooking surface is accessible and a closed position wherein at least a portion of the cooking surface is covered.

A further aspect of the invention relates to a cooking assembly configured for preparation of food products that includes a housing having a first hood member and a base member that define a cooking area, an electric heating element positioned in the cooking area, a cooking surface positioned in the cooking area, and a second hood member positioned within the cooking area and configured to decrease heat lost from the housing during preparation of food products in the cooking area. The second hood member is configured for adjustment between an open position providing access to the cooking surface and a closed position covering at least a portion of the cooking surface.

The above summary of the present invention is not intended to describe each disclosed embodiment or every implementation of the present invention. Figures in the detailed description that follow more particularly exemplify embodiments of the invention. While certain embodiments will be illustrated and described, the invention is not limited to use in such embodiments.

BRIEF DESCRIPTION OF THE DRAWINGS

The invention may be more completely understood in consideration of the following detailed description of various embodiments of the invention in connection with the accompanying drawings, in which:

FIG. 3 is an exploded top perspective view of the grill assembly shown in FIG. 1;

FIG. 4 is a top view of the grill assembly shown in FIG. 1;

FIG. 5 is a front view of the grill assembly shown in FIG. 1;

FIG. 6 is a cross-sectional front view of the grill assembly shown in FIG. 4 taken along cross-sectional indicators 6-6;

FIG. 8 is a top view of the grill assembly shown in FIG. 2;

FIG. 9 is a front view of the grill assembly shown in FIG. 2;

FIG. 11 is a bottom view of the sear plate shown in FIG. 3;

FIG. 12 is a front view of the sear plate shown in FIG. 3;

FIG. 13 is a cross-sectional view of another example sear plate according to principles of the present invention with the heating element embedded in the plate member.

FIG. 19 is a top view of the hood assembly shown in FIG. 14 with the outer hood open and the inner hood closed;

FIG. 20 is a front view of the hood assembly shown in FIG. 19;

FIG. 21 is a side view of the hood assembly shown in FIG. 19;

FIG. 22 is a cross-sectional side view of the hood assembly shown in FIG. 18 taken along cross-sectional indicators 22-22;

FIG. 23 is a top view of the hood assembly shown in FIG. 14 with the outer hood open and the inner hood open;

FIG. 24 is a front view of the hood assembly shown in FIG. 23;

FIG. 25 is a side view of the hood assembly shown in FIG. 23;

FIG. 26 is a cross-sectional side view of the hood assembly shown in FIG. 19 taken along cross-sectional indicators 26-26.

Figure 1:
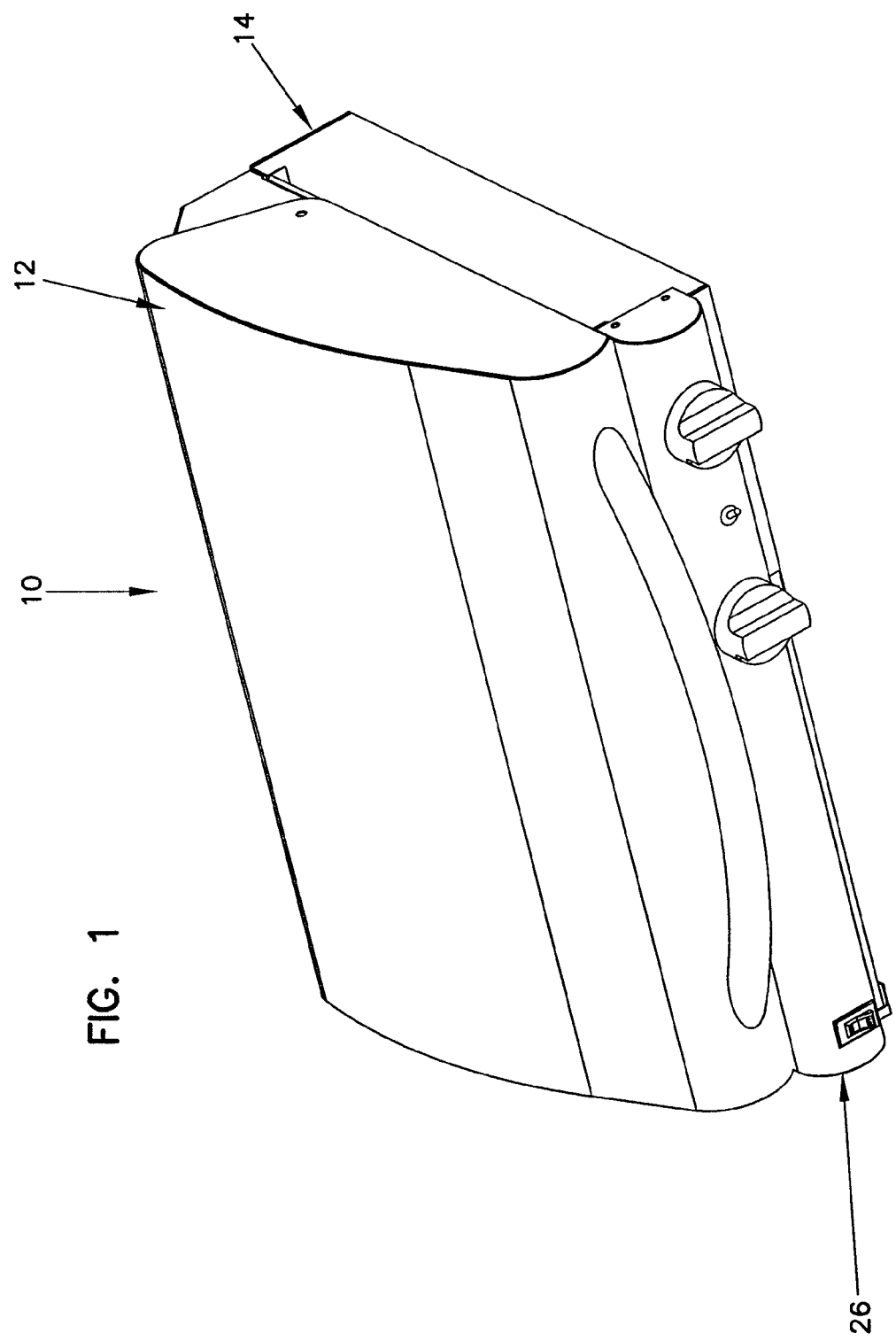
FIG. 1 is a top perspective view of an example grill assembly made in accordance with principles of the present invention with the hood in a closed position.
Figure 2:
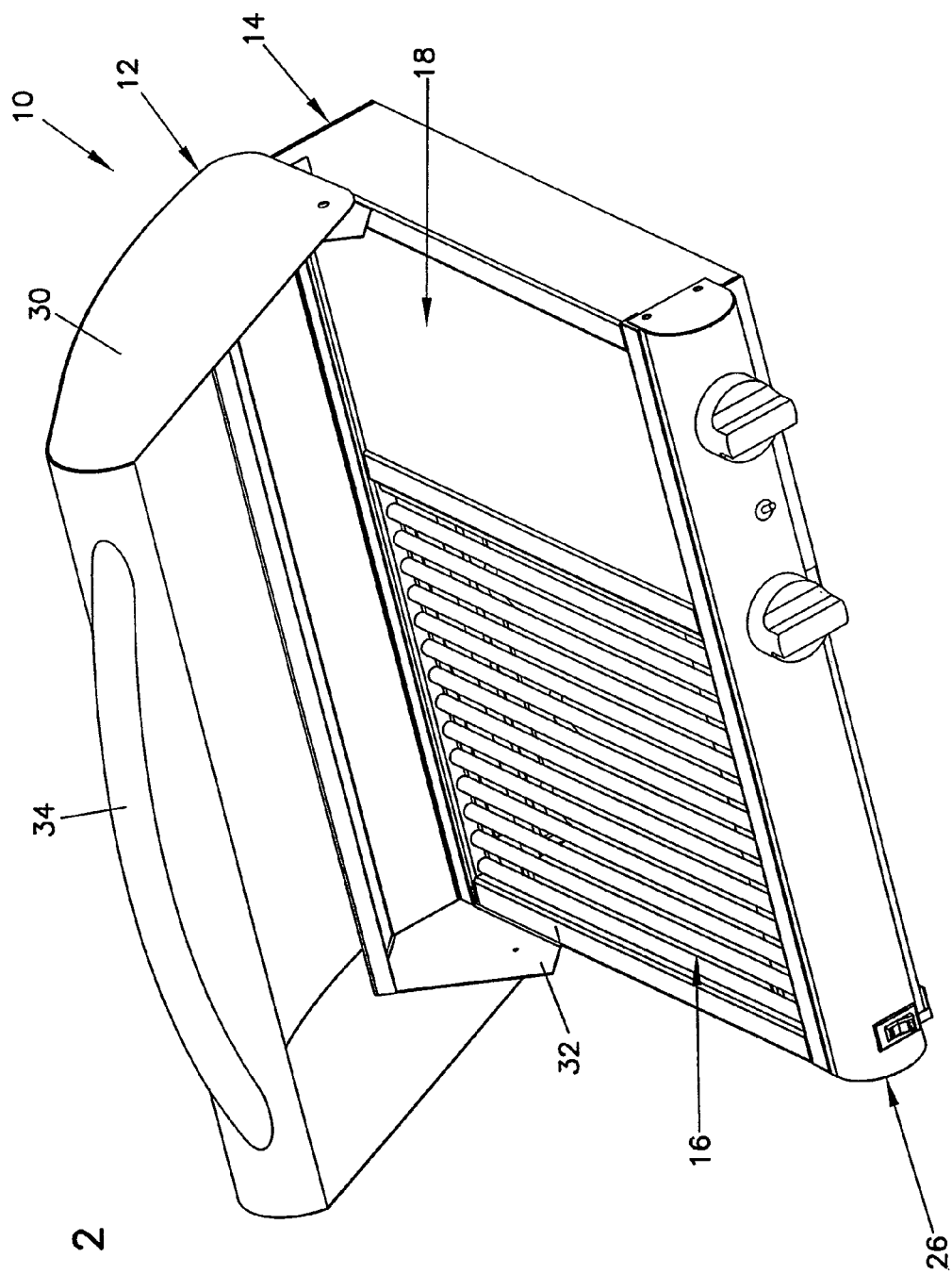
FIG. 2 is a top perspective view of the grill assembly shown in FIG. 1 with the hood in an open position.
Figure 10:
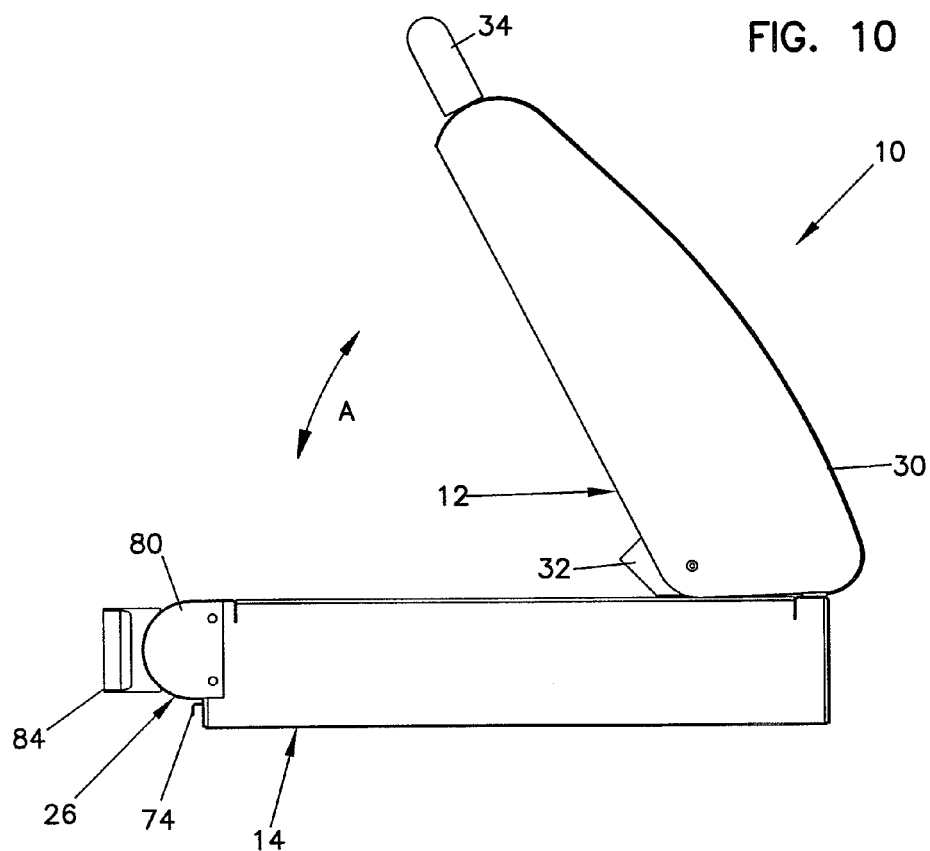
FIG. 10 is a side view of the grill assembly shown in FIG. 2.
Figure 7:
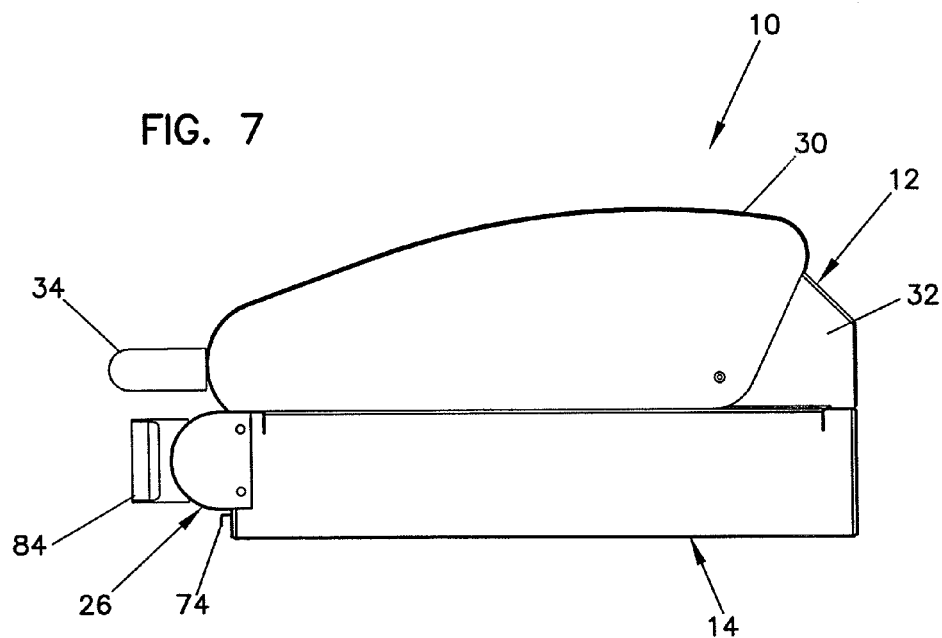
FIG. 7 is a side view of the grill assembly shown in FIG. 1.

While the invention is amenable to various modifications and alternate forms, specifics thereof have been shown by way of example and the drawings, and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION OF THE PREFERRED EMBODIMENTS

The present invention relates generally to grill assemblies for preparing food products, and more particularly relates to an electric grill assembly and grill assemblies having a dual hood configuration. One grill assembly configuration includes first and second cooking surfaces that are heated by separate electric elements. Typically, either the first or the second electric heating element is used at a given time to heat respective first and second heating surfaces in order to provide sufficient heat when using a standard 110 to 120 V power source. The first and second electric heating elements may have different configurations that may relate directly to the structure of the cooking surfaces. For example, when the first cooking surface is a standard grilling grate, the first electric element may be a serpentine shaped electric element that is spaced vertically below the grill grate. This configuration provides heating of the food articles being cooked on top of the cooking surface by heat provided by the electric element through the space between the grate structures and with heat conducted through the grate structure material. When the second cooking surface is a sear plate made from a cast metallic material, and the second electric element may be embedded in the structure of the second cooking surface. This configuration may be well suited for providing high temperatures in the sear plate while using the same or similar amounts of power as is required for an electric element associated with a grill grate cooking structure. Thus, the grill assembly of the present invention may have different heating element configurations and different cooking surface structures while using a common source of power.

Another aspect of the invention relates to a grill hood assembly that is configured for improved containment of heat within the grill assembly. This improved hood assembly includes an outer hood member that is movable between open and closed positions, and an inner hood member that is positioned within an enclosed space defined by the outer hood member and is also movable between open and closed positions to provide access to the cooking surface covered by the outer and inner hood members. Example hood assemblies of the present invention are described below in further detail with reference to the Figures. Reference to the various embodiments does not limit the scope of the present invention, which is limited only by the scope the claims attached hereto.

As used herein, the term "hood" is defined as any structure used to cover or enclose other parts or features such as the cooking surface of a grill assembly. The term "cooking surface" is defined as any surface adapted and configured for cooking or heating different types of food articles. The term "electric element" or "electric heating element" is defined as a structure that generates heat in the presence of an applied current or voltage. The term "cooking area" is a defined space in which sufficient heat exists in order to cook or warm food articles and is typically associated with a cooking surface and a heat source. The term "food products" or "food articles" is generally meant to include any consumable products such as meats, vegetables, fruits, or other food products capable of being cooked and/or heated using a cooking assembly such as a grill.

Referring now to FIGS. 1-12, an example grill assembly 10 is shown in various views with the hood assembly members in opened and closed positions. The grill assembly 10 includes a hood assembly 12, a base 14, first and second cooking structures 16, 18, first and second electric heating elements 20, 22, a spill tray 24, and a control assembly 26 (see FIG. 3). The hood assembly 12 includes a hood 30, a base 32, and a handle 34. The hood 30 is movable relative to the base 32 in the direction A (see FIGS. 7 and 10) using the handle 34 to provide access to a cooking area 46 (see FIG. 6) between the hood assembly 12 and the base 14. The base 14 includes a side wall 40 defining an outer circumference of the base, a floor 42, and an intermediate wall 44 that divides the base 14 into separate cavities sized for the first and second cooking structures 16, 18.

The first cooking structure 16 includes a plurality of grate members 50 that are held together with cross supports 52. The first cooking structure 16 may be made from materials common to grilling assemblies such as, for example, stainless steel. The second cooking structure 18 is a plate-like structure having an upper surface 60 configured for searing food articles, and an opposing lower surface 62. The second electric heating element 22 may be mounted directly to the lower surface 62 (see FIGS. 11 and 12). In another embodiment (see the cross-sectional view of FIG. 13), a heating element 222 may be embedded within or otherwise permanently coupled to a second cooking structure 218. The second cooking structure 18 may be made of cast aluminum or other heat absorbing material such as stainless steel or other metal alloy. Preferably, the second cooking structure 18 can obtain cooking temperatures on the upper surface 60 of about 500 to about 800° F. using a power source that provides about 1,000 to 1,400 W using about 10 to about 12 A of current. More preferably, the second cooking structure 18 attains a temperature of about 700 degrees Fahrenheit using up to about 1,100 watts of power and about 10 amps of current.

The first electric element 20 preferably defines a shaped structure (for example, a contoured shaped structure) that provides a relatively even amount of heat across the first cooking structure 16. The first electric heating element 20 is preferably spaced vertically below the first cooking structure 16, but may be in contact with features of the first cooking structure such as the cross supports 52 (see FIG. 6). The first electric heating element provides cooking temperatures within the cooking area 46 in the range of about 300 to about 500° F. using up to about 1350 W of power at about 10 to 12 A of current.

According to the configuration of the first and second electric heating elements 20, 22, at least two separate cooking conditions can be provided within the grill assembly 10 using the same power source (e.g., a common 110 to 120 V power source). Because the available power using a 110 to 120 V source is relatively low while the desired cooking temperatures for the first and second cooking structure 16, 18 is relatively high, it may be necessary to use only one of the first and second electric heating elements 20, 22 at any given time. However, if a greater power source is available (e.g. 220 to 240 V power source), it may be possible to power both electric heating elements at the same time while providing the desired temperatures. A greater power source may also make possible the use of larger heating elements for a larger cooking area or a greater number of heating elements. In either case, the example grilling assemblies disclosed herein provide improved heat generating efficiency for the power source provided.

In some embodiments, the power being supplied to the first and second heating elements 20, 22 can be regulated with, for example, a rheostat, to control the temperature being used to cook the food article. For example, the food article may require a lower or specific cooking temperature and the power can be regulated to reach that temperature.

The spill tray 24 is positioned below the first cooking structure 16 and includes a side wall 70, a floor 72, and a handle 74. The spill tray 24 is configured for collecting grease and other by-products that fall from the food articles being cooked. The spill tray 24 may be made from a material having a high reflectivity so as to reflect heat that is emanating from the first electric heating element 20 towards the floor 42 of the base 14 back toward the food articles being cooked on the first cooking surface 16. The spill tray 24 may be easily removable from the base 14 using the handle 74. A heat reflective member (not shown) that is separate from or replaces the spill tray 24 may be positioned within the base 14 (e.g., below first electric element 20) or may be positioned adjacent to the hood 30 and base 32 of the hood assembly 12 to reflect heat generated by the first and second electric heating elements 20, 22 back toward the cooking structures 16, 18.

The control assembly 26 includes a panel member 80, first and second temperature controls 82, 84, an on/off power switch 86 and a power allocation switch 88. The switches and controls 82, 84, 86 and 88 are merely exemplary of those control features that may be necessary and useful with the grill assembly 10. The first and second temperature controls 82, 84 may be used to control the amount of power provided to the respective first and second electric heating elements 20, 22. The power allocation switch 88 may be used to allocate power to one or the other or both of the first and second electric heating elements 20, 22. If power is allocated to both the first and second electric heating elements 20, 22, a differential power can be used to provide, for example, more power to the first heating element 20 to increase the temperature of the first electric heating element 20 and less power to the second electric heating element to lower the temperature of the second electric heating element 22. The on/off power switch 86 may be used as master power control to the grill assembly 10 for safety purposes in the event that the first and second temperature controls 82, 84 are not turned to the off position at the completion of cooking the food articles.

In some embodiments, the second electric heating element 22 may be configured so that there is no variation in the temperature of the second cooking structure 18. In such a configuration, the power allocation switch 88 may be used to either turn the second electric heating element on or off, and when in the off position power is allocated to the first electric heating element 20. According to this configuration, the second temperature control 84 may be a timer rather than a temperature control. In one embodiment, the timer can be used simply to measure cooking time. In another embodiment, the timer can be coupled to the power source to regulate the length of time the first and second heating elements 20, 22 are supplying heat in the grill. For example, the timer can be set to a thirty minutes and at the end of the thirty minutes power is shut off to the first and second heating elements 20, 22.

In still further embodiments, the grill assembly may include a temperature gauge (not shown) that monitors the temperature within the cooking area 46. The control assembly 26 may further include a controller that includes a programmable microprocessor and memory and is capable of automatically controlling certain features of the grill assembly 10. For example, such a controller may be used to monitor the temperature within the cooking area 46 and automatically alter the power allocation to the first and second electric heating elements 20, 22 to maintain a pre-determined temperature within the cooking area. In another example, the controller may be used to provide cooking options and cooking information at a display screen (e.g., options for cooking times and temperatures) that can be viewed and implemented upon selection by the user.

Figure 27:
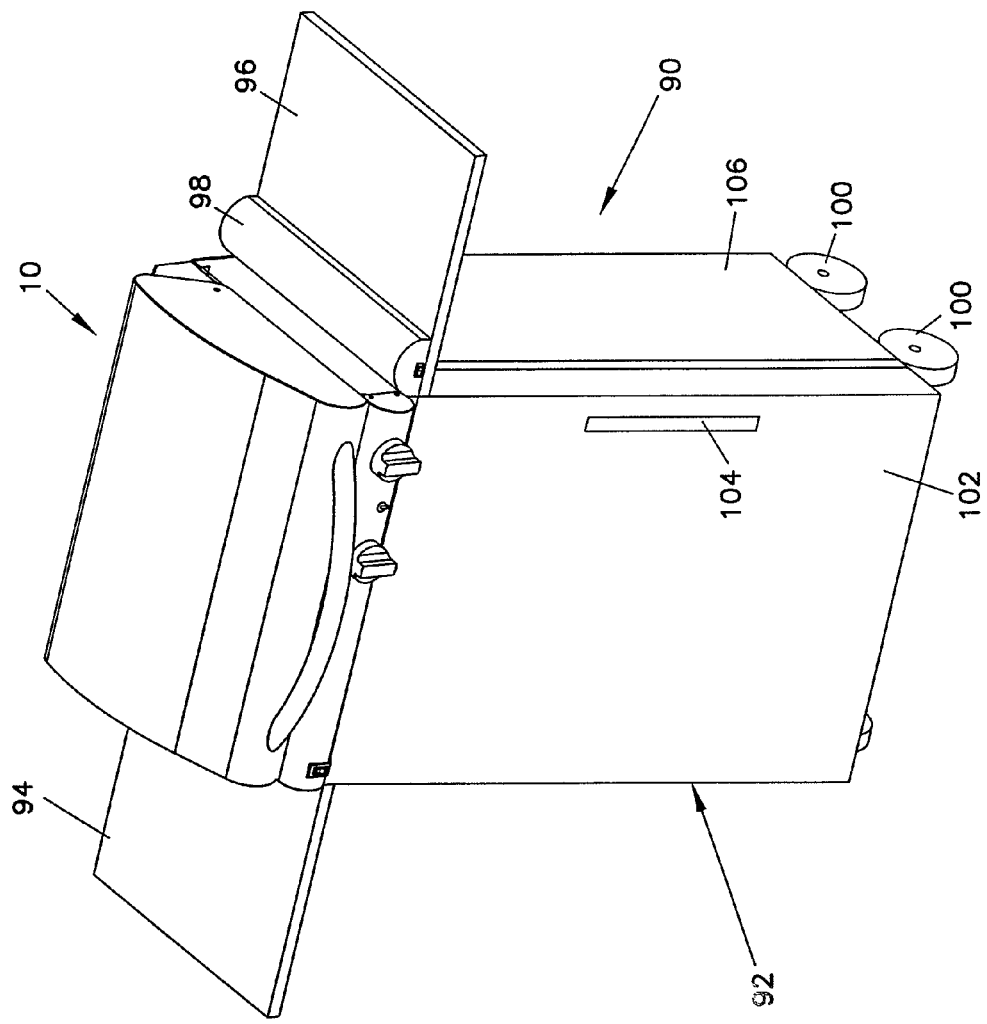
FIG. 27 is a front perspective view of the grill assembly shown in FIG. 1 in combination with an example grill stand assembly.

The grill assembly 10 may be used in combination with a grill stand assembly 90 as shown in FIG. 27. Stand assembly 90 includes a base 92 in the form of a refrigerator, first and second trays 94, 96, and a light fixture 98. The refrigerator 92 may include wheels 100, a door 102, a handle 104, and a casing 106 sized to receive food articles. The refrigerator 92 and light fixture 98 may be powered by the same power source (e.g., a 110 to 120 V power source) used to power the grill assembly 10. In order to provide the necessary power requirements for the heating elements of the grill assembly, the refrigerator 92 may be automatically powered off in when the grill assembly features are turned on. In most instances, turning off the refrigerator 92 should not be problematic for keeping the refrigerated food articles cold because grill assemblies are commonly used for only a short period of time (e.g., about an hour or less) when preparing food articles.

The first and second trays 94, 96 may be movable between upright positions as shown in FIG. 27 and retracted positions in which they lay flat against sides of the refrigerator 92. In other embodiments, the trays 94, 96 may have integrated therein separate heating elements such as a hot plate style heating element for preparing food outside of the cooking area 46. Thus, the stand assembly 90 may provide multiple functions and may be movable via the wheels 100 to convenient cooking locations both inside and outside of a living structure, while also providing additional refrigerator space.

Another example grill assembly embodiment (not shown) that incorporates principles of the present invention includes an adjustable electric heating element that is movable within the cooking area between different positions relative to the cooking structures.

Referring now to FIGS. 14-26, an alternate hood assembly 112 is shown in various open and closed positions. Hood assembly 112 includes first and second outer hood member 120, 122 and first and second inner hood members 130, 132. The first outer hood member 120 includes a handle 124 and a temperature gauge 126 mounted thereon and is movable in a direction B (see FIGS. 18 and 22) relative to the second outer hood member 122. The first inner hood member 130 is movable in the direction C (see FIGS. 17 and 18) relative to the second inner hood member 132 and may include a flap/cover member 134 coupled to an end thereof.

FIGS. 14-18 illustrate the first outer hood member 120 in a closed position in which the first and second outer hood members 120, 122 would preferably completely cover the cooking surfaces of the grill assembly (not shown) associated with the hood assembly 112. For example, hood assembly 112 may take the place of hood assembly 12 and be configured to cover the first and second cooking surfaces 16, 18 in the grill assembly 10 shown in FIGS. 1-12 described above. Hood assembly 112 may also be used with the grill assembly shown and described in U.S. patent application Ser. No. 09/885,360 filed on Jun. 20, 2001, and entitled COOKING ASSEMBLY HAVING MULTIPLE COOKING MODALITIES, which application is incorporated herein by reference in its entirety.

Figure 18:
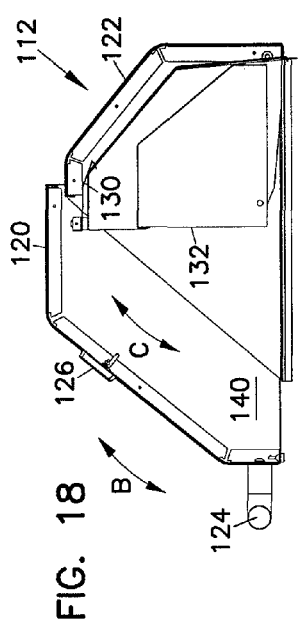
FIG. 18 is a cross-sectional side view of the hood assembly shown in FIG. 14 taken along cross-sectional indicators 18-18 with the inner hood open.
Figure 17:
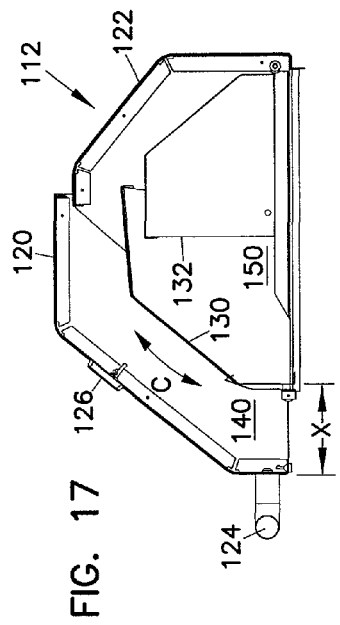
FIG. 17 is a cross-sectional side view of the hood assembly shown in FIG. 14 taken along cross-sectional indicators 17-17 with the inner hood closed.
Figure 16:
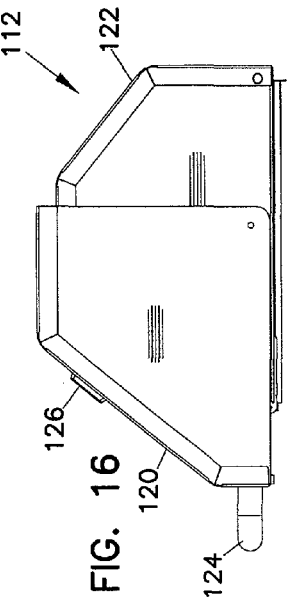
FIG. 16 is a side view of the hood assembly shown in FIG. 14.
Figure 14:
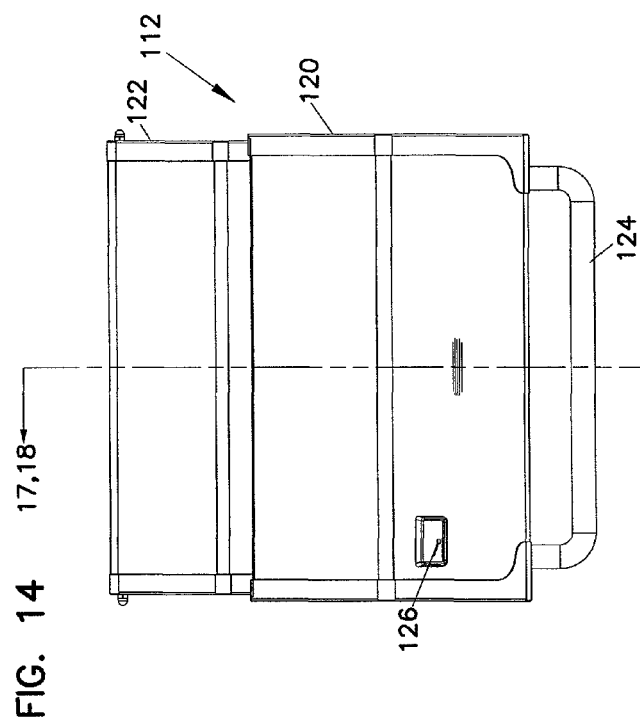
FIG. 14 is a top view of an example hood assembly made in accordance with principles of the present invention with the outer hood closed.
Figure 15:
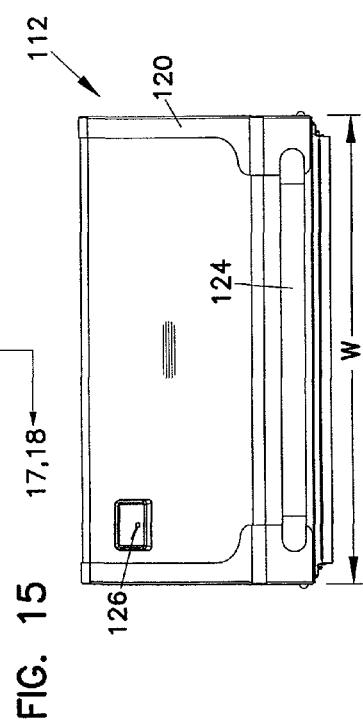
FIG. 15 is a front view of the hood assembly shown in FIG. 14.

The first and second outer hood members 120, 122 define a first cooking area 140 within which the first and second inner hood members 130, 132 are positioned. When the first outer hood member 120 is in a closed position, the first inner hood member 130 is movable between a closed position as shown in FIG. 17 and an open position as shown in FIG. 18. When both the first outer hood member 120 and first inner hood member 130 are in a closed position and the flap 134 is in a horizontal position covering the otherwise uncovered cooking surface in the space defined by distance X in FIG. 17, the hood assembly 112 provides a dual hood configuration in which the cooking area 150 has two insulating layers. Hood assembly 112 can sustain higher temperatures within cooking area 150 with less power or heat because there is less heat loss than in typical grill assemblies. These advantages can result in shorter cooking times and lower operating costs.

To gain access to a cooking surface within the second cooking area 150, the first outer hood member 120 must be raised as shown in FIGS. 19-22, and then the first inner hood member 130 must be raised as shown in FIGS. 23-26. In some types of cooking applications it may be advantageous to close one or the other of the first hood members 120, 130 depending on a number of factors including, for example, the desired size of the cooking surface to be used, the desired cooking time and/or temperature, or the convenience or inconvenience of opening one versus two hood members to gain access to the cooking surface.

As mentioned above, the flap 134 may be used to cover specific portions of the cooking surface over which the hood assembly 112 is positioned. The flap 134 may be adjusted from a retracted position as shown in FIGS. 17-22 to a downward, covering position (not shown) to cover a portion of the cooking surface.

In some embodiments, the first and second inner hood members 130, 132 may extend across only a portion of the hood assembly width (not shown) rather than extending across the entire width W as shown in FIGS. 14-26. Such a reduced width inner hood assembly may be useful in combination with a grill assembly that includes separate cooking surfaces such as grill assembly 10, wherein there may be a preference to provide a dual hood configuration for either the first or second cooking surface 16, 18.

The present invention should not be considered limited to the particular examples or materials described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the instant specification.

We claim:

1. An electric cooking assembly configured for preparing food products, the cooking assembly comprising:
   a main body portion defining a cooking area including a first cooking surface and a second cooking surface;
   a first electric heating element associated with the first cooking surface, the first electric heating element arranged and configured to provide heat to at least a portion of the first cooking surface;
   a second electric heating element associated with the second cooking surface, the second heating element arranged and configured to heat at least a portion of the second cooking surface, wherein the first and second electric heating elements are separately controlled;
   a first control member configured to separately control power delivered from a single power source to the first and second heating elements, the first control member having a first position and a second position, wherein when the first control member is in the first position, the first control member directs power to the first electric heating element, and wherein when the first control member is in the second position, the first control member directs power to the second electric heating element; and
   a second control member configured to control power provided to the first control member.

2. The cooking assembly of claim 1, further comprising a temperature probe configured to monitor temperatures within the cooking area and provide a temperature signal.

3. The cooking assembly of claim 1, wherein the single power source is a 110-120 V power source.

4. The cooking assembly of claim 1, wherein the first electric heating element includes a contoured shape.

5. The cooking assembly of claim 1, further comprising a heat reflective member positioned vertically below the first electric heating element and the first cooking surface.

6. The cooking assembly of claim 3, wherein the second electrical heating element is adapted and configured to heat the second cooking surface using about 1000 to about 1400 Watts of power and about 8 to about 14 Amps of current.

7. The cooking assembly of claim 1, wherein the main body portion further includes a base member and a first hood member, the first hood member defining an outer surface of the cooking assembly and being movable relative to the base member to provide access to the cooking area.

8. The cooking assembly of claim 7, further comprising a second hood member positioned at least partially within the cooking area between the first hood member and base member.

9. The cooking assembly of claim 3, wherein the first cooking surface includes a grill situated and arranged vertically above the first electric heating element.

10. The cooking assembly of claim 9, wherein the second cooking surface includes a cast material and defines a searing plate cooking surface.

11. The cooking assembly of claim 1, further comprising a light generating member positioned adjacent to the base member and operable to provide light within the cooking area.

12. The cooking assembly of claim 1, further comprising a stand configured to support the main body portion at an elevated position, wherein the stand portion is a refrigerator.

13. A method of operating a cooking apparatus, the cooking apparatus including a main body portion, a grill member, a searing plate, first and second electric heating elements, and first and second control members, the main body portion including a base member and a hood member that define a cooking area, the method comprising the steps of:
    positioning the grill member and searing plate in the cooking area;
    positioning the first electric heating element in the cooking area at a location between the grill member and the base member and spaced apart from the grill member;
    positioning the second electric heating element in the cooking area at a location between the searing plate and the base member and in engagement with the searing plate;
    coupling the first control member to the first and second electric heating elements to separately control power delivered to the first and second electric heating elements from a single power source, wherein the power is allocated by the first control member either only to the first electric heating element or only to the second electric heating element; and
    coupling the second control member to the first control member and to the single power source to control power allocated to the first control member.

14. The method of claim 13, wherein the cooking apparatus further includes a temperature probe, and the method further comprises monitoring temperatures within the cooking area and providing a temperature signal with the temperature probe.

15. An electric cooking assembly configured for preparing food products, the cooking assembly comprising:
    a main body portion defining a cooking area;
    a grill member positioned in the cooking area;
    a searing plate positioned in the cooking area;
    a first electric heating element positioned in the cooking area aligned with and spaced apart from the grill member;
    a second electric heating element positioned in the cooking area in engagement with the searing plate;
    a first control member configured to direct power from a single power source to either the first electric heating element or the second electric heating element, wherein only one of the first and second electric heating elements is operable at a given time; and
    a second control member configured to control power from the single power source to the first control member.

16. The cooking assembly of claim 15, further comprising a temperature probe configured to monitor temperatures within the cooking area and provide a temperature signal, wherein power is directed to the temperature probe by the second control member.

17. The cooking assembly of claim 15, wherein the second electric heating element is adapted and configured to heat the searing plate using about 1000 to about 1400 Watts of power and about 8 to about 14 Amps of current.

18. The cooking assembly of claim 15, wherein the searing plate comprises a cast material construction.

19. The cooking assembly of claim 15, further comprising a light generating member positioned adjacent to the base member and operable to provide light within the cooking area.

20. The cooking assembly of claim 15, further comprising a stand configured to support the main body portion at an elevated position, wherein the stand portion is a refrigerator.

* * * * *